United States Patent

Vaitovirta et al.

[19]

[11] Patent Number: 5,771,460
[45] Date of Patent: Jun. 23, 1998

[54] PROCESSING SIGNALLING MESSAGES IN A MOBILE COMMUNICATION SYSTEM

[75] Inventors: Hannu Vaitovirta, Espoo; Mika Heiskari, Liminka, both of Finland

[73] Assignee: Nokia Telecommunications Oy, Espoo, Finland

[21] Appl. No.: 532,632

[22] PCT Filed: Feb. 13, 1995

[86] PCT No.: PCT/FI95/00062

§ 371 Date: Dec. 18, 1995

§ 102(e) Date: Dec. 18, 1995

[87] PCT Pub. No.: WO95/22871

PCT Pub. Date: Aug. 24, 1995

[30] Foreign Application Priority Data

Feb. 14, 1994 [FI] Finland ................................. 940687

[51] Int. Cl.⁶ ................................ H04B 7/00; H04Q 7/20
[52] U.S. Cl. ................................... 455/517; 455/524
[58] Field of Search ............................ 455/54.1, 54.2, 455/58.1, 34.1, 33.1, 33.4, 53.1, 62, 67.1

[56] References Cited

U.S. PATENT DOCUMENTS

| 4,866,788 | 9/1989 | Mouly et al. . | |
|---|---|---|---|
| 5,054,109 | 10/1991 | Blackburn | 455/54.2 |
| 5,109,528 | 4/1992 | Uddenfeldt | 455/33.2 |
| 5,287,552 | 2/1994 | Sasuta et al. . | |
| 5,442,807 | 8/1995 | Takayama | 455/54.2 |

FOREIGN PATENT DOCUMENTS

| 0 485 351 | 5/1992 | European Pat. Off. . |
|---|---|---|
| 0 594 458 | 4/1994 | European Pat. Off. . |

*Primary Examiner*—Reinhard J. Eisenzopf
*Assistant Examiner*—Sam Bhattacharya
*Attorney, Agent, or Firm*—IP Group of Pillsbury Madison & Sutro LLP

[57] ABSTRACT

A mobile communication system and a method of processing signalling messages in a mobile communication system comprising mobile stations and base stations, the receiver units of the base stations being tuned to the same channel, in which method more than one mobile station transmits a signalling message to the base stations on the same channel in such a way that the signalling messages are received at the base stations so that they overlap at least partly in time. In order to utilize the signalling messages which are received at the base stations so that they overlap at least partly in time, these signalling messages are stored in a memory, an examination is conducted on whether the signalling message transmitted by a mobile station has been received in several similar versions, and if it has been, one of the signalling messages of that mobile station is selected for further examination, an examination is conducted on which mobile station has transmitted the most urgent signalling message received at least partly simultaneously with the other signalling messages, and an operation is performed on the basis of the information included in the most urgent signalling message.

21 Claims, 2 Drawing Sheets

PROCESSING SIGNALLING MESSAGES IN A MOBILE COMMUNICATION SYSTEM

This application claims benefit of international application PCT FI95/00062, filed Feb. 13, 1995.

FIELD OF THE INVENTION

The invention relates to a method of processing signalling messages in a mobile communication system comprising mobile stations and base stations, the receiver units of the base stations being tuned to the same channel, in which method more than one mobile station transmits a signalling message to the base stations on the same channel in such a way that the signalling messages are received at the base stations so that they overlap at least partly in time.

BACKGROUND OF THE INVENTION

In radio networks comprising several base stations and repeating the same frequencies at determined intervals, it is possible to optimize the re-use of the frequencies very effectively, if there are enough available channels, i.e. radio frequencies. Problems begin to occur when there are too few available channels. Such a situation occurs often in private mobile radio networks (PRM). One solution to this problem is to use the same frequency at adjacent base stations and to synchronize the base stations in such a way that the mobile stations can understand the shared signal of both base stations. Such a method is called the use of quasi-synchronized base stations or a simulcast system. "Simulcast" refers to a method of increasing a cell by using on the same radio channel two or more base stations, which have at least one radio transmitter/receiver pair. The receivers of all base stations listen to the same channel.

The pocket phones used in mobile communication systems have a lower power and a weaker antenna, i.e. a smaller antenna gain, than the base station has, wherefore the pocket phone can hear the transmission of the base station without problems, but since the power of the pocket phone or some other radio phone is a lot lower than that of the base station, the base station can hear the transmission of the mobile station, i.e. the radio phone, poorly or not at all. To eliminate this problem, it is possible to use in the terrain additional receivers connected to the main base station. These are positioned in such a way that the transmission of a pocket phone, or some other low-power radio phone, reaches one of these additional receivers, even though it does not reach the actual base station, i.e. the one which comprises both a transmitter and a receiver.

These arrangements of the prior art are characterized in that in both of them at least two geographically closely positioned receivers listen to the signalling of the mobile stations on the same channel. Thus, when the mobile stations transmit in a place where the coverage areas of the base stations overlap, the control unit of the mobile communication system receives the same information from several base stations. The control unit selects for processing one of the messages transmitted by the mobile stations to the base stations and rejects the other messages.

The problems of the prior art arrangements also occur in a situation where two or more mobile stations transmit uplink signalling substantially simultaneously in the coverage area of different receivers, i.e. base stations. FIG. 1 shows this situation. In the figure, the mobile stations x and y transmit signalling 110, 112 simultaneously. Thus the control unit simultaneously receives, from two or more different radio phones, signalling which has not been mixed on the radio path. If, on the other hand, more mobile stations transmit signalling in the coverage area of the same receiver, the transmissions are mixed together in the receiver of the base station and they cannot be interpreted.

In the above-described situation according to the prior art, the prior art systems may operate, for example, in such a way that they directly add together the signalling messages from the different receivers before the processing, whereupon the messages interfere with each other and none of them can be interpreted. The other alternative is that the systems of the prior art select one of the signalling messages received by the base stations on the basis of, for example, signal strength or some other criterion, and take that signalling message for processing. The problem with this method is that all the other signalling messages received at the same time are destroyed, and the information included in them cannot be utilized.

SUMMARY OF THE INVENTION

The purpose of the invention is to solve the problems of the prior art arrangements. The purpose of the invention is to provide a method and a mobile communication system which make it possible to process, in a controlled manner, signalling messages transmitted substantially simultaneously on the same channel by several mobile stations, i.e. received at the base stations of the system substantially simultaneously, in such a way that the operations directed by the information included in all the simultaneously received signalling messages can be performed.

This new type of method of processing signalling messages in a mobile communication system is achieved with the method according to the invention, which is characterized by the following steps: the signalling messages which are received at the base stations so that they overlap at least partly in time are stored in a memory means, an examination is conducted on whether the signalling message transmitted by some mobile E station has been received in several similar versions, and if it has been, one of the signalling messages of that mobile station is selected for further examination, an examination is conducted on which mobile station has transmitted the most urgent signalling message received at least partly simultaneously with the other signalling messages, and an operation is performed on the basis of the information included in the most urgent signalling message.

The invention also relates to a mobile communication system comprising mobile stations and base stations the receiver units of which are tuned to the same channel, the base stations communicating with a control unit by means of telecommunication connections. The mobile communication system according to the invention further comprises means for examining which mobile station has transmitted the most urgent signalling message received at the base stations at least partly simultaneously with the signalling messages transmitted by the other mobile stations, and for initiating the operation to be performed on the basis of the information included in that signalling message.

The invention is based on the idea that the signalling messages transmitted by the mobile stations substantially simultaneously on the same channel to the base stations are stored in a memory, and additional copies of the messages are eliminated. Next, the message to be processed first is selected from the signalling messages received substantially simultaneously, and the desired operation is performed on the basis of the information included in that signalling message. After this, the next most urgent signalling message is taken for processing.

The advantage of such a mobile communication system and such a method of processing signalling messages in a mobile communication system is that they solve the problems of the prior art arrangements.

In the method of the invention, the system, typically its control unit, does not unnecessarily reject overlapping uplink signalling messages as the prior art systems do, but all simultaneously received signalling messages can be stored and the desired operations can be performed on the basis of the information they include.

A further advantage of the method according to the invention is that the uplink signalling capacity of the system of the invention is greater than that of the prior art systems.

BRIEF DESCRIPTION OF THE DRAWINGS

In the following, the invention will be described in greater detail with reference to the accompanying drawings, in which.

DETAILED DESCRIPTION OF A PREFERRED EMBODIMENT OF THE INVENTION

Figure 1:
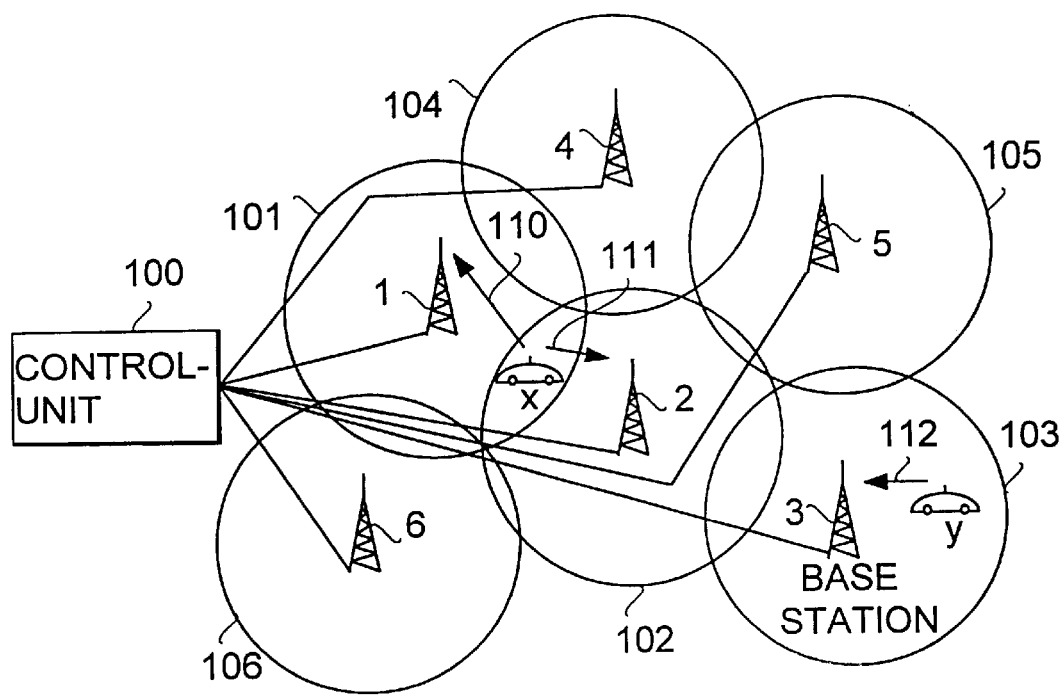
FIG. 1 shows schematically an arrangement according to the prior art.

FIG. 1 represents schematically a prior art arrangement, which shows base stations 1 to 6 listening to the same signalling channel, their coverage areas 101 to 106, and a control unit 100 communicating with the base stations. The control unit 100 may be a unit controlling the base stations and arranged in connection with one of the base stations. Thus, for example in a system which employs additional base stations, in this case base stations 1 and 3 to 6, the control unit 100 may be positioned in connection with the actual base station, i.e. the base station 2 comprising both transmitter and receiver units. The control unit 100 may be a base station controller (BSC). Furthermore, the control unit may be a mobile switching centre (MSC) or a trunking system controller (TRC). FIG. 1 shows mobile stations x, y.

In the situation according to the prior art shown in FIG. 1, the mobile station x transmits a signalling message 110, 111 in such a way that the base stations 1 and 2 receive it. The base stations direct the versions of this signalling message received via different ways, to the control unit, where, according to the prior art, they either mix together whereupon one of them is destroyed, or the one with the greater signal strength is selected for processing. At the same time as the mobile station x has transmitted its signalling message 110, 111, also the mobile station y has transmitted its own signalling message 112 to the base station 3. The base station 3 has directed that signalling message to the control unit 100, where it has arrived substantially simultaneously with the signalling message 110, 111 transmitted by the mobile station x. This simultaneity means that the signalling messages arrive at the control unit in such a way that they hit, for example, the same TDMA time slot, or that they arrive at the control unit in such a way that they overlap in time. In such a case, the control unit has selected, according to the prior art, one of the received signalling messages, for example the one with the greater signal strength. At the same time, the other signalling message has been lost and the information included in it could not have been utilized.

Figure 2:
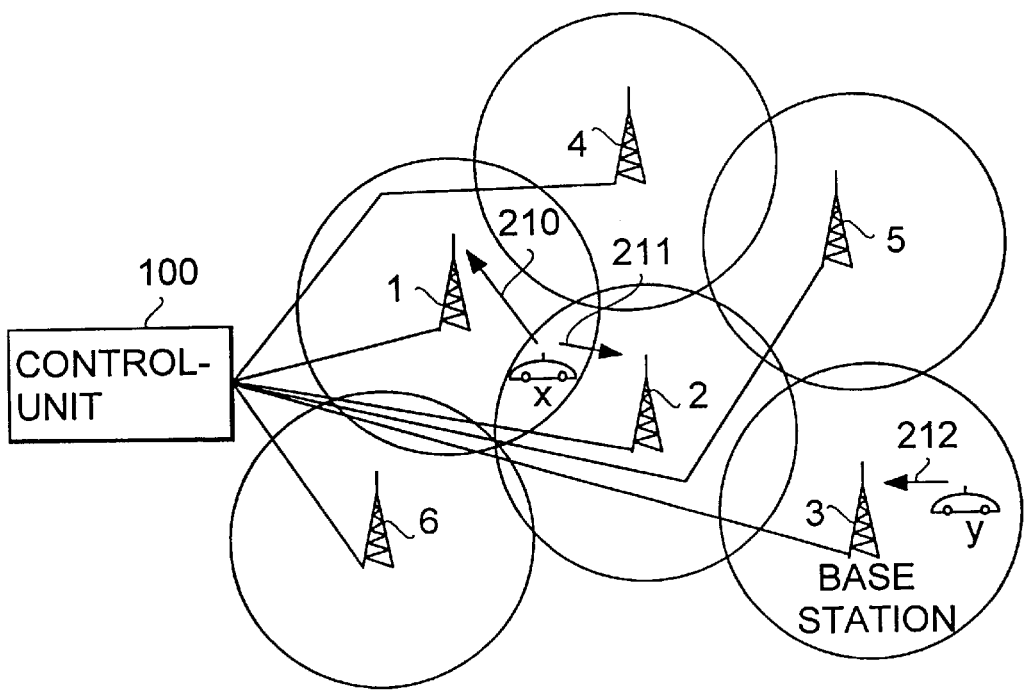
FIG. 2 shows schematically an arrangement according to the invention.

FIG. 2 shows schematically the arrangement according to the invention. In the arrangement, the mobile station x transmits a signalling message 210, 211 in such a way that it is received at the base stations 1 and 2. Each base station directs the signalling message it has received to the control unit 100. Further, the mobile station y simultaneously transmits a signalling message 212 via the base station 3 to the control unit. Now all the signalling messages 210, 211, 212 received by the base stations arrive substantially simultaneously at the control unit 100. This simultaneity may thus mean that the signalling messages hit the same time slot or that they overlap at least partly in time. Thus, the signalling messages received at the base stations and directed to the control unit according to the invention are stored in a memory means 407. After this, redundancy is eliminated from the signalling messages, i.e. it is examined whether the signalling message transmitted by one of the mobile stations has been received in several similar versions. Thus, for example in the case of FIG. 2, the signalling messages 210, 211 transmitted by the mobile station x are similar, wherefore one of them can be eliminated. One way is to eliminate the one with the lower quality, i.e. the one with the weaker bit error ratio or signal strength.

Next, it is examined which of the received signalling messages freed of redundancy is the most urgent, i.e. the message which is to be processed next and which contains the information on the basis of which an operation will be performed. The urgency of the signalling message may be determined randomly, on the basis of the priority of the transmitting mobile station, or the priority of the signalling message, for example in such a way that the signalling messages transmitted by the prioritized mobile stations are processed first, or that the prioritized signalling messages or messages related to, for example, emergency calls are processed first. Furthermore, the urgency of the signalling message can be determined by the time the message was received, so that even if the signalling messages are received substantially simultaneously, i.e. in such a way that they hit for example the same TDMA time slot, the message received at the control unit absolutely first is selected for further processing. Furthermore, the order of urgency of the signalling messages may be determined by the mutual order of priority of the receiving base stations. The base stations may have a mutual order of priority, which may favor particular base stations. For example, the main base station, i.e. the base station comprising both transmitter and receiver units, may be favored, or the base station of a particular geographical area.

When the control unit 100 has processed the first, i.e. the most urgent, signalling message, it takes for processing, from the memory means 407, the next most urgent signalling message stored there and performs the desired operation on the basis of the information included in the message.

In the method and the system according to the invention, it is also possible that if the mobile station transmitting signalling messages manages to transmit the same signalling message again before the same signalling message previously transmitted by that mobile station has been examined in the control unit and before an operation is performed on the basis of the information the message includes, either one of the messages transmitted by the mobile station is removed from the memory means. This ensures that the control unit will not accidentally perform the same operation twice in a row on the basis of the information included in two identical signalling messages.

Figure 3:
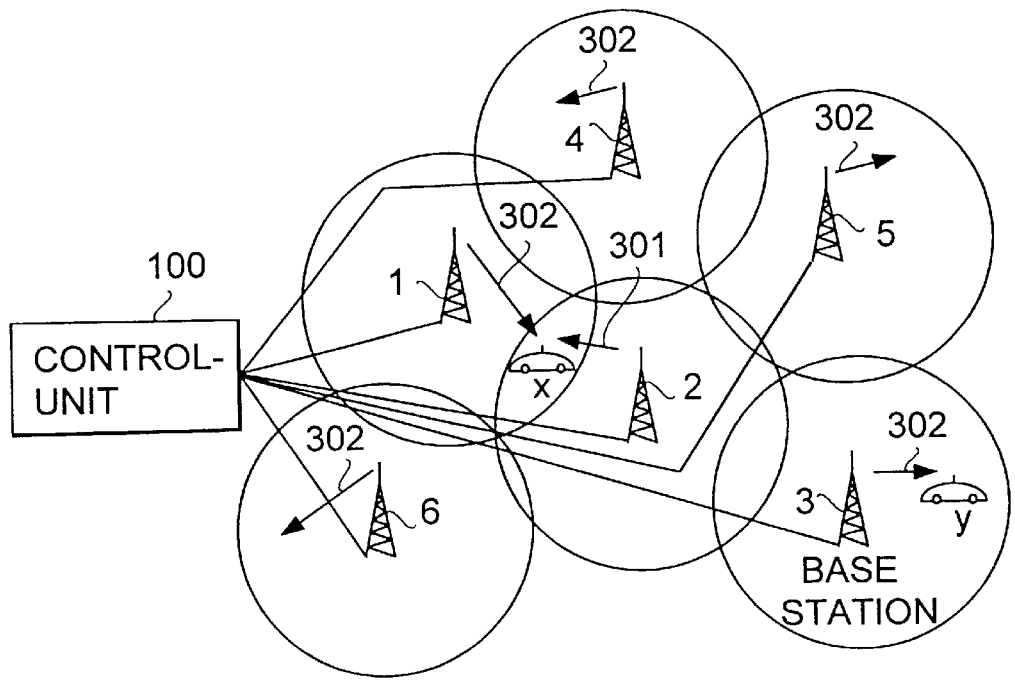
FIG. 3 shows schematically the arrangement according to the invention in a situation where the base stations transmit more simultaneous signalling messages than can be processed.

FIG. 3 shows schematically the arrangement according to the invention in a situation where the base stations 1 to 6 receive more simultaneous signalling messages than they can process. In such a case, if the base stations 1 to 6 receive more substantially simultaneous signalling messages than can be processed, according to the invention, the control unit 100 commands the mobile stations to stop transmitting new signalling messages for a desired period. The mobile stations are commanded to stop transmitting new messages by transmitting a transmission blocking message 301, 302 to the mobile stations. When additional base stations are used, the transmission blocking message 301 may be transmitted from the main base station 2, or if the system is quasi-synchronized, the message may be transmitted from all the base stations 1 to 6 as messages 301 and 302.

Figure 4:
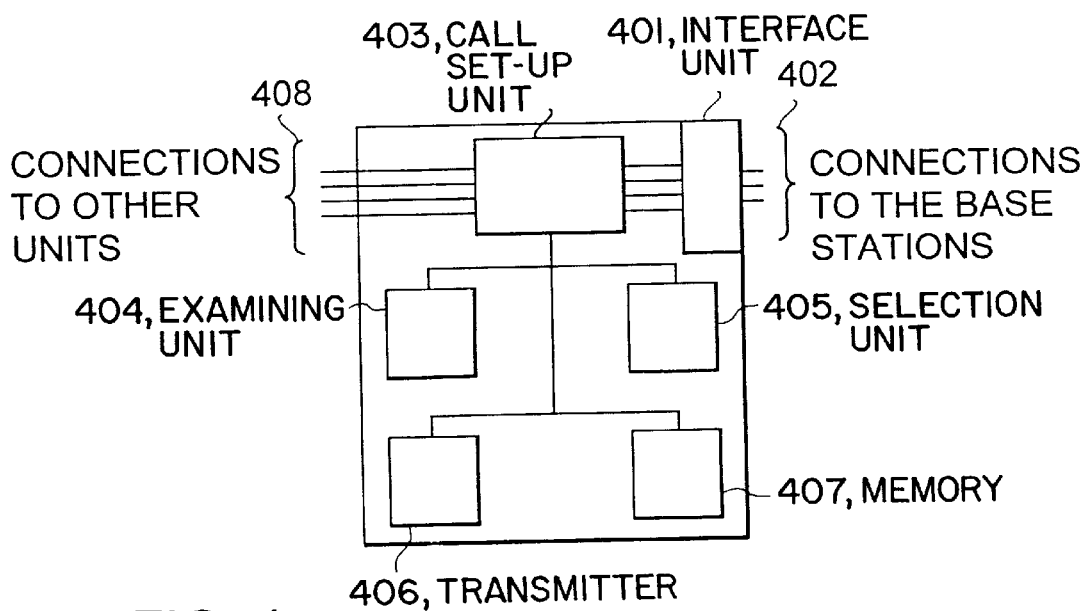
FIG. 4 shows the control unit of the mobile communication system according to the invention.

FIG. 4 shows the control unit 100 of the mobile communication system according to the invention. The control unit comprises connections 402 to the base stations 1 to 6, which are shown in FIGS. 1 to 3. The control unit comprises an interface unit 401, which forms the connections to the base stations 1 to 6. The control unit 100 also comprises call set-up means 403, which may also include switching means for switching connections. The control unit 100 also comprises memory means 407 for storing signalling messages which are received at the base stations so that they overlap at least partly in time. The control unit also comprises means 404 for examining which mobile station x has transmitted the most urgent signalling message 210 received at the base stations at least partly simultaneously with the signalling messages 210, 211 transmitted by the other mobile stations y, and for starting the operation to be performed on the basis of the information included in that signalling message.

The control unit according to the invention also comprises means 405 for examining whether the signalling message 210, 211 transmitted by some mobile station x has been received in several similar versions, and if it has, for selecting for further examination the signalling message with the most suitable, for example the best, quality. For example the signal strength or bit error ratio of the transmitter/receiver may be used as the criteria for the quality. It must be noted that in the mobile communication system according to the invention, the above-described means may be positioned in the described control unit or somewhere else in the mobile communication system. The control unit may also be considered an independent mobile exchange, but it also has connections 408 to other network elements, for example to exchanges, and to other telecommunication networks.

The mobile communication system according to the invention, for example its control unit, comprises means 406 for transmitting transmission blocking messages to the mobile stations, which stop transmitting new signalling messages for a desired period in response to these messages.

In the following, the operation of the invention is described in practice. When the control unit 100 receives two or more signalling messages 210, 211, 212 substantially simultaneously, the control unit operates in the following way according to the invention.

First, the control unit interprets all the signalling messages and stores them in the memory means 407. If more than one signalling message has arrived from the same mobile station, for example a radio phone, the control unit 100, or more accurately its means 405, selects one of these. After this, the control unit has thus one message from each mobile station x, y which has transmitted signalling. Next, the control unit 100, more accurately its means 404, selects one of the signalling messages for immediate processing on the basis of the time of arrival of the message, the message identification, the priority of the transmitter or the message, or any other parameter, or randomly. Simultaneously, the control unit 100 stores the other messages in a queue. Next, the control unit 100 processes the messages in the queue, when radio resources are available. The control unit 100 may also stop new uplink signalling messages from arriving during the processing by transmitting a transmission-blocking message 301, 302 to the mobile stations x, y. If the radio phone waiting to be served manages to transmit the same signalling message before the processing of the message it previously transmitted, the control unit 100 removes either one of the messages from the queue, i.e. from the memory means 407.

The drawings and the description related thereto are only meant to illustrate the idea of the invention. The details of the method of processing signalling messages in a mobile communication system and the mobile communication system according to the invention may vary within the scope of the claims. Even though the invention is described above mainly in connection with mobile communication systems, the invention can also be used in other kinds of telecommunication systems.

We claim:

1. A method of processing signalling messages in a mobile communication system, comprising the steps of:
   (a) providing a plurality of base stations, each having at least one receiver unit;
   (b) tuning at least one receiver unit of each of said base stations to a same channel;
   (c) transmitting a respective signalling message by each of more than one mobile station of said mobile communication system to said base stations on said same channel in such a way that said signalling messages are received at a plurality of said base stations so that said signalling messages overlap at least partly in time;
   (d) storing in a memory said overlapping signalling messages;
   (e) conducting an examination as to whether any respective said signalling message transmitted by a said mobile station has been received in several similar versions at least one of which is a respective said overlapping signalling message, and, if it has, selecting only one of versions for further examination as to urgency and eliminating others of said versions from such further examination;
   (f) examining as to urgency said overlapping signalling messages stored in step (d), minus any eliminated from further examination as to urgency, as a result of conducting step (e), and, based on said examination as to urgency, selecting a most urgent signalling from among those examined as to urgency; and
   (g) performing an operation on the basis of the information included in said most urgent signalling message.

2. The method according to claim 1, further comprising:
   subsequent to conducting step (g), processing the signalling messages stored in the memory in step (d) but for any eliminated in step (e) from further examination, insofar as the system has capacity.

3. The method according to claim 1:
   said step of examining as to urgency is performed by determining priority of the respective said mobile station which transmitted of said overlapping signalling messages according to a given hierarchy.

4. The method according to claim 1, wherein:
said step of examining as to urgency is performed by determining priority of each of said overlapping signalling messages according to a given hierarchy.

5. The method according to claim 1, wherein:
said step of examining as to urgency is performed by determining the time each of said overlapping signalling messages was received and assigning priority in time of reception order.

6. The method according to claim 1, wherein:
said step of examining as to urgency is performed by determining a mutual order of priority of the respective ones of said base stations which received different versions of a said overlapping signalling message.

7. The method according to claim 1, wherein:
said step of examining as to urgency is performed by determining urgency randomly.

8. The method according to claim 1, wherein:
in step (e), one of said signalling messages received in several similar versions is selected for further examination based on the bit error ratios of said similar versions.

9. The method according to claim 1, wherein:
in step (e), one of said signalling messages received in several similar versions is selected for further examination based on the signal strengths of said similar versions.

10. The method according to claim 8, wherein:
in step (e), one of said signalling messages received in several similar versions is selected for further examination based on the signal strengths of said similar versions.

11. The method according to claim 1, wherein:
if a respective said mobile station transmitting one iteration of a signalling message which has become one of said overlapping signalling messages manages to transmit another iteration of the same signalling message again before the respective signalling message previously transmitted by that mobile station has been examined in step (f) and an operation has been performed in step (g) on the basis of the information it contains, removing either iteration of the respective signalling message from said memory.

12. The method according to claim 1, wherein:
if, in practicing step (c) the base stations receive more substantially simultaneous signalling messages than they can process, commanding the mobile stations by said system to stop transmitting new signalling messages for a desired period.

13. The method according to claim 12, wherein:
said commanding is accomplished by transmitting a transmission blocking message to the mobile stations.

14. A mobile communication system comprising:
a plurality of mobile stations arranged to transmit signalling messages on a same channel;
a control unit;
a plurality of base stations each having at least one receiver unit tuned to said same channel;
telecommunication connections between said base stations and said control unit, said base stations being arranged for communicating with said control unit via said telecommunication connections including communicating to said control unit signalling messages received at said base stations so that said signalling messages overlap at least partly in time; and
said control unit including:

a memory arranged for storing said signalling messages communicated thereto via said telecommunication connections;
means for examining whether, among said signalling messages stored in said memory a signalling message has been received from a same said mobile station in plurality of versions, and for selecting only one of said versions for further examination as to urgency and eliminating others of said versions from such further examination;
means for further examining from said signalling messages stored in said memory, after performing said selecting and eliminating, which mobile station among a potential plurality of said mobile stations which have transmitted respective signalling messages, has transmitted a most urgent signalling message received at a plurality of said base stations at least partly simultaneously with signalling messages transmitted by others of said mobile stations; and
means for starting an operation to be performed on the basis of information included in that most urgent signalling message.

15. The mobile communication system according to claim 14, wherein the mobile communication system further comprises:
means for examining whether a signalling message transmitted by one of said mobile stations and received at a plurality of said base stations has been received in several similar versions, and if it has, for selecting only one of said versions for further examination as to urgency.

16. The mobile communication system according to claim 15, wherein:
said means for examining whether a signalling message has been received in several similar versions are arranged to select the version to be further examined on the basis of the relative quality of the respective versions.

17. The mobile communication system according to claim 14, further comprising:
memory means for storing the signalling messages which are received at a plurality of the base stations and overlap at least partly in time.

18. The mobile communication system according to claim 14, further comprising:
means for transmitting transmission-blocking messages to the mobile stations, for causing said mobile stations to stop transmitting new signalling messages for a desired period.

19. The mobile communication system according to claim 15, further comprising:
means for transmitting transmission-blocking messages to the mobile stations, for causing said mobile stations to stop transmitting new signalling messages for a desired period.

20. The mobile communication system according to claim 16, further comprising:
means for transmitting transmission-blocking messages to the mobile stations, for causing said mobile stations to stop transmitting new signalling messages for a desired period.

21. The mobile communication system according to claim 17, further comprising:
means for transmitting transmission-blocking messages to the mobile stations, for causing said mobile stations to stop transmitting new signalling messages for a desired period.

* * * * *